US010104515B1

(12) United States Patent
Graves et al.

(10) Patent No.: US 10,104,515 B1
(45) Date of Patent: Oct. 16, 2018

(54) BEACON-IMPLEMENTED SYSTEM FOR MOBILE CONTENT MANAGEMENT

(71) Applicant: BKON Connect, Inc., Nashville, TN (US)

(72) Inventors: Richard C. Graves, Nashville, TN (US); Chris Blanz, Franklin, TN (US); Beat Zenerino, Nashville, TN (US); Kevin Huber, Nashville, TN (US); Greg Thornton, Nashville, TN (US)

(73) Assignee: BKON Connect, Inc., Nashville, TN (US)

( * ) Notice: Subject to any disclaimer, the term of this patent is extended or adjusted under 35 U.S.C. 154(b) by 0 days.

(21) Appl. No.: 15/488,775

(22) Filed: Apr. 17, 2017

Related U.S. Application Data

(63) Continuation of application No. 15/076,368, filed on Mar. 21, 2016, now Pat. No. 9,629,064.
(Continued)

(51) Int. Cl.
*H04W 4/00* (2018.01)
*H04W 4/20* (2018.01)
(Continued)

(52) U.S. Cl.
CPC ............... *H04W 4/20* (2013.01); *H04L 67/02* (2013.01); *H04L 67/18* (2013.01); *H04L 67/20* (2013.01);
(Continued)

(58) Field of Classification Search
CPC ......... H04W 4/00; H04W 4/02; H04W 4/021; H04W 4/04; H04W 4/08; H04W 48/08;
(Continued)

(56) References Cited

U.S. PATENT DOCUMENTS 7,024,552 B1 4/2006 Caswell et al.
7,038,584 B2 5/2006 Carter
(Continued)

FOREIGN PATENT DOCUMENTS

WO 200158098 A2 8/2001
WO 2009010401 A2 1/2009
(Continued)

*Primary Examiner* — Duc M Nguyen
(74) *Attorney, Agent, or Firm* — Patterson Intellectual Property Law, P.C.

(57) ABSTRACT

A mobile content management system includes a plurality of location-based source devices (e.g., beacon transmitters, QR codes, NFC tags), each associated with a source URL comprising a hosted domain and a unique identifier. A hosted user interface enables designation by an authorized user of destination URLs for the respective source devices. A client device with a resident hosted mobile application reads the source URL from a source device and generates a first call to the hosted server comprising the source device identifier, wherein selectable tokens are generated on the client device interface comprising displayed metadata corresponding to the source device and previewing selectable destination content. Upon user selection of a token, the application generates a second call to the hosted server, wherein the hosted server directs the client device to at least one of the one or more destination URLs designated for the respective source device.

11 Claims, 7 Drawing Sheets

Related U.S. Application Data

(60) Provisional application No. 62/293,515, filed on Feb. 10, 2016, provisional application No. 62/239,936, filed on Oct. 11, 2015, provisional application No. 62/152,659, filed on Apr. 24, 2015, provisional application No. 62/136,157, filed on Mar. 20, 2015.

(51) Int. Cl.
| | | |
|---|---|---|
| *H04L 29/08* | (2006.01) | |
| *H04W 12/06* | (2009.01) | |
| *H04W 4/80* | (2018.01) | |
| *H04W 4/021* | (2018.01) | |

(52) U.S. Cl.
CPC ...... *H04L 67/2804* (2013.01); *H04L 67/2814* (2013.01); *H04W 4/008* (2013.01); *H04W 4/80* (2018.02); *H04W 12/06* (2013.01); *H04W 4/021* (2013.01)

(58) Field of Classification Search
CPC ..... H04W 48/10; H04W 48/18; H04W 76/02; H04W 76/021; H04L 67/15; H04L 67/18; H04L 67/20
See application file for complete search history.

(56) References Cited

U.S. PATENT DOCUMENTS

| | | | |
|---|---|---|---|
| 7,146,293 | B2 | 12/2006 | Badovinac et al. |
| 7,170,881 | B2 | 1/2007 | Chaskar |
| 7,233,990 | B1 | 6/2007 | Debaty et al. |
| 7,263,361 | B2 | 8/2007 | Taylor |
| 7,299,256 | B2 | 11/2007 | Pradhan et al. |
| 7,509,131 | B2 | 3/2009 | Krumm et al. |
| 8,045,482 | B2 | 10/2011 | Davis et al. |
| 8,200,816 | B2 | 6/2012 | Lzrailevsky et al. |
| 8,396,485 | B2 | 3/2013 | Grainger et al. |
| 8,665,154 | B2 | 3/2014 | Lin et al. |
| 9,629,064 | B2 * | 4/2017 | Graves ................ H04W 40/244 |
| 2002/0085515 | A1 * | 7/2002 | Jaynes ................... G06Q 20/04 370/329 |
| 2002/0152273 | A1 * | 10/2002 | Pradhan ............ G06F 17/30861 709/206 |
| 2010/0148954 | A1 | 6/2010 | Bobier |
| 2010/0266125 | A1 * | 10/2010 | Tanaka .................. H04W 8/205 380/270 |
| 2012/0246247 | A1 * | 9/2012 | Lim ....................... H04W 48/12 709/206 |
| 2012/0303439 | A1 * | 11/2012 | Flitcroft ............... G06Q 10/107 705/14.36 |
| 2013/0065584 | A1 | 3/2013 | Lyon et al. |
| 2013/0104038 | A1 | 4/2013 | Galper et al. |
| 2013/0217332 | A1 | 8/2013 | Altman et al. |
| 2013/0226704 | A1 | 8/2013 | Fernandez |
| 2013/0251216 | A1 | 9/2013 | Smowton et al. |
| 2013/0290070 | A1 | 10/2013 | Abraham et al. |
| 2014/0143060 | A1 | 5/2014 | Fernandez |
| 2014/0181256 | A1 | 6/2014 | Trifa et al. |
| 2014/0222573 | A1 | 8/2014 | Middleton et al. |
| 2015/0005011 | A1 | 1/2015 | Nehrenz et al. |
| 2015/0067819 | A1 * | 3/2015 | Shribman ............... H04L 67/06 726/12 |
| 2015/0140933 | A1 * | 5/2015 | Muller .................... H04W 4/12 455/41.2 |
| 2015/0140982 | A1 * | 5/2015 | Postrel .................. H04W 4/008 455/418 |
| 2015/0201329 | A1 * | 7/2015 | Daigle .................. H04L 9/3228 705/67 |
| 2015/0215737 | A1 | 7/2015 | Shin et al. |
| 2015/0282046 | A1 | 10/2015 | Shin et al. |
| 2015/0312164 | A1 * | 10/2015 | Yasunaga .............. H04W 12/08 709/203 |
| 2016/0119288 | A1 * | 4/2016 | Ardeli ................. H04L 63/1416 726/12 |
| 2016/0127875 | A1 | 5/2016 | Zampini, II |

FOREIGN PATENT DOCUMENTS

| | | |
|---|---|---|
| WO | 20130108243 A1 | 7/2013 |
| WO | 2014210556 A1 | 12/2014 |

\* cited by examiner

BEACON-IMPLEMENTED SYSTEM FOR MOBILE CONTENT MANAGEMENT

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application is a continuation of U.S. patent application Ser. No. 15/076,368, filed Mar. 21, 2016, which claims benefit of U.S. Provisional Patent Application Nos. 62/136,157, dated Mar. 20, 2015; 62/152,659, dated Apr. 24, 2015; 62/239,936, dated Oct. 11, 2015; and 62/293,515, dated Feb. 10, 2016, each of which are hereby incorporated by reference in their entirety.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to systems implementing wireless radio signal transmissions and mobile content management. More particularly, this invention relates to the deployment and management of location-based technologies in the context of mobile content management systems. An exemplary embodiment of location-based technologies as described herein includes a managed network of Bluetooth Low Energy ("BLE") beacons, but alternately may include for example near field communication (NFC) applications, or even QR codes and the like.

The emergence of BLE beacons is one of numerous recent technological factors wherein consumers are increasingly enabled to interact directly with their surroundings, discovering new content, retrieving information "served up" because of its contextual relevance, and responding with their feedback and desires.

There are several protocols in the market over which BLE beacons operate, including for example Apple's iBeacon protocol, which consists of a fixed length bit package (UUID/Major Identifier/Minor Identifier) that is in turn interpreted by compatible mobile Apps. However, in order to truly unlock the potential for interaction with any "smart device" upon demand, it would be desirable to reduce or eliminate the need for users to download an app associated with each respective group of devices. In keeping with the objective of rapid expansion of the Web into the physical world, it is therefore desirable to make the process of adding an element just as simple as adding a new web page.

Alternative and open source protocols such as for example UriBeacon and Eddystone-URL have been implemented, and may be referred to herein as Physical Web beacons, wherein the beacons broadcast a Uniform Resource Identifier ("URI") such as without limitation a Uniform Resource Locator ("URL") or uniform Resource Name ("URN"), in the context of accessing a network location such as a website address. As used herein, URI may refer interchangeably to a unique identifier associated with a beacon, a URN, or a URL, except in instances where the URL is specified as including the unique identifier associated with the beacon (the URI). The Physical Web has been promoted as a primary link between the physical world and the Internet, where places and things in can communicate via websites. Much like QR codes, Physical Web beacons will be universally accessible, and will not require a custom App, as are required by for example the iBeacon protocol.

The conventional mode of operation with a Physical Web beacon is straightforward. With an administrative App designed to configure beacons, and when physically near to the target beacon, one can connect with a Physical Web beacon and program it with the URI in combination with a network location and methodology of retrieving content from said destination—in practical terms a URL. The target beacon references this URI to broadcast the desired URL. A special browser executable from a client device is configured to read the broadcast from that beacon and connect to the destination URL in the normal way.

However, in order to connect to current Bluetooth beacons such as a UriBeacon or Eddystone beacon and change the URL which it advertises, the user must be physically near the beacon, because the process is accomplished over a Bluetooth low energy link, which has a limited range. This proximity requirement can be particularly problematic where the user wishes to implement and provide periodic updates for numerous beacons across an inconveniently large area, or otherwise make appropriate range settings for a suitable user experience. The associated need for an unfamiliar, and sometimes awkward, programming task (e.g., taking the beacon's batteries out, or pushing a button) inhibits an otherwise familiar and straightforward process. This task is made unmanageable for widely dispersed installations by the requirement to have to handle each beacon in order to adjust its settings. Therefore, it would be desirable to eliminate the requirement of locally and directly interacting with the beacon for configuration by enabling a network-based management platform for the plurality of beacons in a dispersed installation.

Further, another limitation of the Eddystone and UriBeacon protocol is that the maximum size of the advertisement data field is 17 or 18 characters respectively (at present), so for example:
www.xxxxYYYY.com
fits fine, whereas:
https://github.com/google/uribeacon/tree/master/specification
will not fit.

For this reason, domain name shortening services are recommended and are commonly used with Eddystone beacons and UriBeacons. In the above example, if the second URL were plugged into the "Goo.gl" domain shortening application, the user would obtain http://goo.gl/Du29uS. If the user clicks on this link, he/she will be directed to the original link, but first must go to http://Goo.gl, where the link will be translated before redirection to the correct site. This short-URL to destination-URL relationship can be problematic because additional URL information appended to the shortened URL, such as UTM codes, location information, or other information tags are lost when the shortened URL is translated into the destination URL. It would therefore be desirable to eliminate not only the step of interacting directly with the beacon, but further or at least in the alternative to eliminate the requirement of having to use third-party domain shortening applications for destinations having more than 18 characters, and to provide a methodology where contextual information appended to a shortened URL can be transferred to the associated destination URL.

Another problem in conventional applications is that websites currently have embedded content that is displayed by a browser upon search. These typically include the website's title, its favicon, and its description. Because this information is embedded in the website, it is not easily changed without making direct changes to the website. For websites displayed on a beacon browser (e.g., Physical Web browser) it would be beneficial if the title, favicon, and description of a website could be dynamically changed.

For example, if a restaurant's menu is on a website to be accessed and reviewed by people near to the restaurant, then it would be desirable to the restaurant owner to be able to change the title for that website (as displayed on a person's browser) to say "Meat Loaf Special today" or "2 for 1 PBR's" or "Free appetizer's for the next hour" or whatever message the restaurant wants to broadcast in order to capture the attention of passerby's when they scan for location-based websites, and it is preferred that this can be done without having to change the underlying website.

Still another problem with conventional techniques is that beacons currently broadcast content through simple strings including URLs. As such, they are a powerful platform to make relevant content available to consumers in physical locations. However, if multiple beacons broadcast the same URL, then the source location of the user who accesses the beacons is lost. It would therefore be desirable that when location based content is accessed, and when more than one location is associated with that content, that the point of origin of each access can be accurately identified.

BRIEF SUMMARY OF THE INVENTION

Exemplary systems or methods according to the present disclosure provide a unique model of operation that tightly couples a beacon device such as a Physical Web beacon with a cloud based server (e.g., URI Management Server or "UMS"), thereby providing several major advantages over the traditional model.

In various embodiments, a system as disclosed herein includes a plurality of distributed beacon transmitters, each of which are configured to continuously broadcast messages including a URL, and with the URL having a host domain address and an identifier unique to the respective beacon embedded therein. Client devices proximate to one or more of the beacons, and having appropriate browser applications executed thereon, are able to receive the broadcast messages and subsequently transmit content requests to the host server associated with the URL. The host server is further configured to identify the beacon from the unique identifier, and return an appropriate destination URL to the client device for user selection, at which point the browser may for example be redirected to a content server associated with the destination URL for content presentation. The system may further include a hosted and administrator-facing web portal wherein at least destination URLs associated with the respective beacons may be remotely designated.

One aspect of a cloud based web server system as disclosed herein is that it works within the familiar architecture of the web, fitting seamlessly into the existing architecture of common web pages and physical web browsers. The present invention may offer powerful capabilities as centrally situated to monitor traffic between and among browsers interacting with its associated beacons and their destination web pages. The unique and central positioning with respect to a customer scan of his surroundings and the subsequent selection of a website, combined with previously unknown capabilities for location knowledge, enables the present invention to add critical intelligence to a transaction, unachievable in normal web interactions, benefiting both the consumers and creators of content.

In one aspect as disclosed herein, by abstracting hardware management tasks to a server, the tasks of incorporating new objects into an interactive network (e.g., the Physical Web) can be radically simplified. Another benefit is that the use of human-readable identifiers on beacons vastly simplifies human management of these devices, and simply fits them into existing management and inventory systems.

In one aspect, embodiments of a hosted system or method as disclosed herein enable simplified administration. Rather than using an administrative app in near proximity to the target beacon to reprogram the beacon to point to a different destination URL, customized Physical Web beacons (or otherwise a closed network of Physical Web beacons) may be redirected from a cloud server. For someone managing numerous beacons in dispersed locations, this is an important feature, as all beacons may be reprogrammed from a central location, as opposed to being required to visit each beacon.

In another aspect, embodiments of a hosted system or method as disclosed herein provide anti-spoofing functionalities. Because beacons generally broadcast an open-air wireless message, their signal may be captured, mimicked, and rebroadcast from a different device and from a different location. This is typically called "spoofing". Physical Web beacons within the hosted and closed network according to the present disclosure may be prevented from being spoofed because each of them may broadcast a continuously changing unique identifier, which is recognized by the host server.

In another aspect, embodiments of a hosted system or method as disclosed herein detect the presence of users. When websites are accessed through a link broadcast by a hosted Physical Web beacon, the host or other authorized client user or administrator is able to provide positive confirmation that the person accessing the website is in the near proximity to that beacon. While web pages may be generally accessed from any Internet connected device, the ability in this system to recognize the current validity of a beacon's unique identifier allows one to know if access to the website came from someone in the immediate or very recent proximity to that target beacon, or from someone accessing the website either from a different location or at a later time. In an embodiment, this presence detection function is also based upon the host's ability to positively identify its beacons by their keyed pairing with their cloud server.

In another aspect, embodiments of a hosted system or method as disclosed herein enable users to take secure ownership of a beacon, such that it cannot be reprogrammed by a third party, without ever interacting directly with the beacon. By taking ownership of the public beacon identifier in the cloud based UMS, the user is simultaneously securing the physical beacon with the matching identifier.

In yet another aspect, embodiments of a hosted system or method as disclosed herein provide unique device identifiers for each beacon in a hosted or otherwise closed network. The Eddystone protocol for example offers alternate pluralities of frame type transmit modes, including Eddystone-URL, Eddystone-TLM, and Eddystone-UID, wherein the Eddystone UID is a unique identifier. As such, traditional Eddystone beacons must be directly programmed to either broadcast a URL or a UID, or to alternate between the two, which consumes battery life. As beacons in a hosted or otherwise closed network as described herein are always uniquely recognized, their fixed broadcast may be used simultaneously as a URI and as a unique device identifier, or the hosted server can translate the URI into a secure UID rather than into a destination URL. The hosted identifier has the still further additional advantage of being secure from spoofing.

In still another aspect, embodiments of a hosted system or method as disclosed herein provide network trigger points. Because hosted beacons as disclosed herein may typically have a unique broadcast ID, which cannot be copied or spoofed, they may be used as triggers for other applications, or as highly reliable location identifiers.

DETAILED DESCRIPTION OF THE INVENTION

Figure 1:
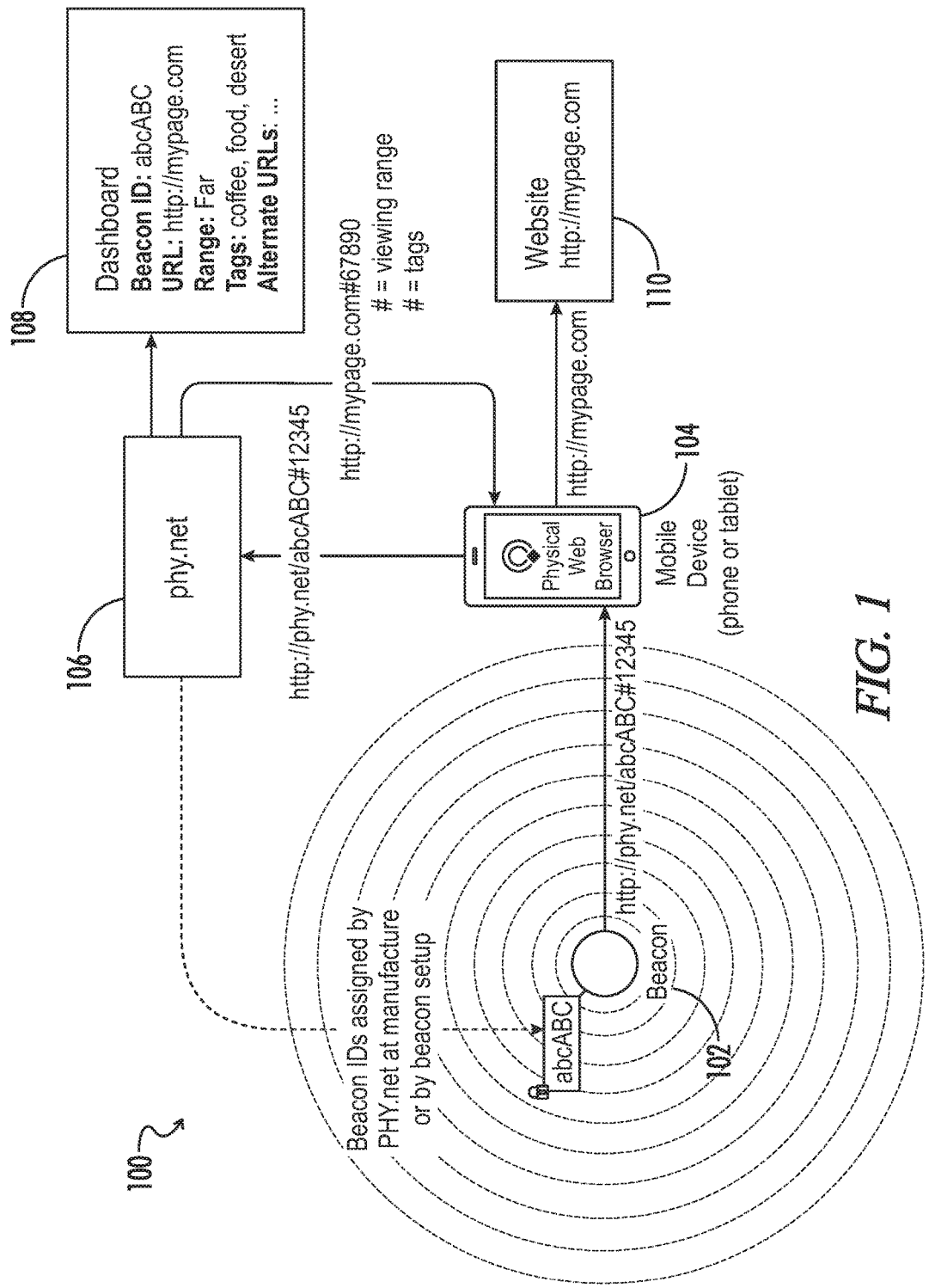
FIG. 1 is a flow diagram representing an embodiment of a hosted beacon web server system according to the present disclosure.

Referring generally to FIGS. 1-7, various exemplary embodiments of an invention may now be described in detail. Where the various figures may describe embodiments sharing various common elements and features with other embodiments, similar elements and features are given the same reference numerals and redundant description thereof may be omitted below.

Referring first to FIG. 1, an exemplary embodiment of a system 100 as disclosed herein may include a beacon 102 that is configured to support some or all of broadcast options including without limitation Eddystone beacon protocols, UriBeacon protocols, RFID tag broadcast, and the like. Broadcast messages from any one or more of a plurality of beacons may be transmitted to proximate mobile computing devices 104 such as for example phones, tablets or the like, wherein such devices are capable of receiving the broadcast messages. A hosted web server 106 is further communicatively linked to the device or otherwise accessible via a communications network. The server is configured to direct a browser or application of the mobile computing device 104 to content via for example a destination URL 110, with the content corresponding to a particular beacon 102 being designated in various embodiments by an administrator or the like via a hosted user interface 108 in association with the hosted web server 106.

In a particular embodiment, a hardcoded URI may be used with a UMS hosted domain (e.g., http://YYY.net or http://ZZZ.biz) as the base link for this URI, followed by a unique beacon identifier, that is a 6-character alpha identifier in the initial implementation, but may be alphanumeric and may also use less or more than 6 characters for the identifier. Because the beacon identifiers may typically be assigned at manufacture or at beacon setup by the host and managed by the corresponding cloud based UMS, they are guaranteed to be unique, and the field length will be expanded if necessary. An example would be: http://YYY.net/AkfGGy, where the identifier/serial number for that beacon would be "AkfGGy". This identifier may in certain embodiments be physically printed on or otherwise visibly discernable with respect to the beacon and/or its packaging, and the default setting of the beacon may be to broadcast this fixed URI (http://YYY.net/AkfGGy). As previously mentioned, one critical user advantage to various embodiments of a system and method as disclosed herein is that those who set up hosted beacons 102 do not have to interact directly with (i.e., in substantial proximity to) beacons with a configuration App to program their destination URL. Setting or changing a beacon's destination URL can be accomplished without ever having to connect with the target beacon over the traditional Bluetooth connection, which requires one to be physically present with the beacon. Users simply have to read the beacon's Unique ID, which is printed on the beacon, go to the web portal 108 for the UMS, and enter the destination URL there in a field associated with the beacon's identifier.

In an embodiment, a system 100 as disclosed herein may incorporate a functionality in the cloud based URI Management System (UMS) that translates a beacon's fixed URI into a desired URL link. As but one example, if beacon 102 with identifier # AkfGGy is to be directed to point to a destination website with the URL of www.Xyz.com, a user is not required to be physically near the beacon itself in order to edit the beacon's URI field, but instead may simply go to the UMS web portal 108 which enables the user to associate the beacon having identifying sub-directory http://YYY.net/AkfGGy (wherein "YYY.net" represents the hosted UMS server address as described herein) to destination URL www.Xyz.com.

In one example of a typical beacon operation, when a user with a browsing mobile device 104 selects the destination website, the browser will automatically link to a website 110 associated with the destination URL as was entered in the UMS server by the beacon's administrator. Typically, the destination URL may be associated with a third party website, content management system, and the like. In some contexts, the destination URL may direct the browser to a hosted content server, whereupon the host will directly present the desired web content.

In certain embodiments, additional information may be embedded into the desired URL link to add contextual information to be processed by one or more of an application upon the mobile device 104, by the UMS cloud server 106, or by the content server of the destination URL.

For example, the UMS may add in addition to the unique, fixed URI a proximity component which informs the mobile device 104 of the range at which the mobile device should display the content of a nearby beacon 102.

As another example, the beacon itself may embed not only its unique identifier, but also additional information such as an indicator of battery state and/or other sensor outputs. The UMS upon receiving an associated message (content request) from the mobile device may then extract the embedded battery state variable, update its management database, and then discard that variable or otherwise add/embed it to the destination URL if desired.

In certain embodiments, other sensory data may be embedded in the initial URL as broadcast by the beacon via information tags such as, but not limited to: movement detection, sound detection, temperature, and light level. The UMS cloud server 106 may process these information tags in accordance with instructions and provide the beacon administrator information via the UMS web portal 108. The UMS cloud server may identify a destination website 110 to be returned to the browser from among a plurality of options based on the contextual information provided via the URL-embedded information tags. In embodiments wherein the UMS is also the content server, it may populate certain content upon user selection of the associated website 110 with different information based on the contextual information provided via the URL-embedded information tags.

The mobile device may further add contextual information regarding for example the associated user, wherein this additional information from the beacon and/or mobile device is added to the original URL with the domain of the UMS. The relevant additional information and/or associated contextual variables, as appended to or otherwise embedded within the URL received by the UMS, may subsequently be added to the destination URL by the UMS.

Figure 2:
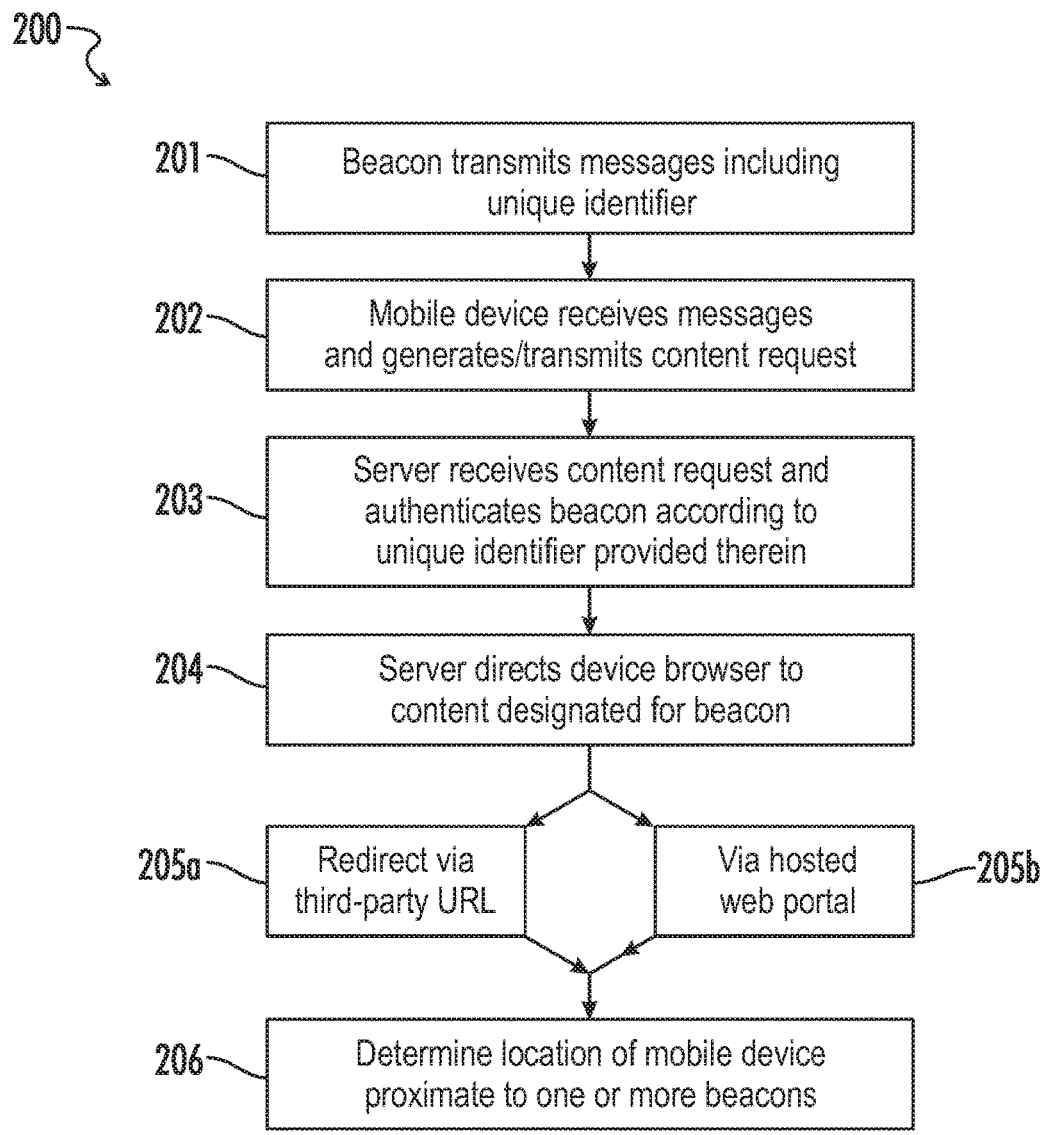
FIG. 2 is a flowchart representing an exemplary embodiment of a process for directing beacon-specific content to a device browser as implemented by the system of FIG. 1.

Referring next to FIG. 2, an exemplary method 200 as disclosed herein for providing some or all of the aspects referenced above may be described as follows. As disclosed herein, various embodiments of a system and method may facilitate a novel interaction between the server and a browser to accomplish a more complete abstraction of beacon hardware from the need for any physical interaction.

Depending on the embodiment, certain acts, events, or functions of any of the algorithms described herein can be performed in a different sequence, can be added, merged, or left out altogether (e.g., it may be not all described acts or events are necessary for the practice of a given process or algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable medium known in the art. An exemplary computer-readable medium can be coupled to the processor such that the processor can read information from, and write information to, the memory/storage medium. In the alternative, the medium can be integral to the processor. The processor and the medium can reside in an ASIC. The ASIC can reside in a user terminal. In the alternative, the processor and the medium can reside as discrete components in a user terminal.

The method 200 may be characterized in part wherein each of a plurality of beacon transmitters are configured to implement a first step 201 wherein one or more beacons transmits via a wireless protocol one or more messages including at least a unique identifier. The unique identifier may take the form of any identification component sufficient to uniquely identify the beacon. The message may in certain embodiments be a URL, wherein the URL contains the unique identifier. In further embodiments, the message may be a shortened URL of 18 characters or less in accordance with for example Eddystone-URL and UriBeacon limitations.

The method 200 may continue with a second step 202 wherein a mobile device proximate to one or more of the beacons receives the one or more corresponding transmitted messages, and further generates a content request in association with the received message or messages from the beacon, and transmits the content request via a communications network to a UMS cloud server. In an embodiment wherein the received message is a URL, the mobile device's generated content request may take the form of the same received URL to be submitted via a browser on the mobile device. In alternative embodiments, the mobile device's generated content request may append, modify, or substitute the received URL with additional tags or other information to provide added context to the originally received message. For example, upon receiving a URL from the beacon, the mobile device may append to the URL information tags which convey information about the device's user, phone state or phone sensor data.

In certain embodiments, the mobile device may generate a content request from the message via an application installed on the mobile device, wherein the application appends, modifies, or substitutes information to the received message in accordance with application-specific parameters. For example, an application may add information tags sufficient to identify user, the application, the mobile device being used, the type of mobile device being used, information specific to or received by the mobile device, user-inputted information, and the like.

The method 200 may continue with a third step 203 wherein the host server receives the content request from the mobile device and authenticates the beacon corresponding to the content request according to the unique identifier provided therein and in relation to the beacon's unique identifier. In an embodiment, the beacon may be authenticated wherein the unique identifier includes or embodies a public key and a derivative of a private key, wherein the derivate of the private key is authenticated in accordance with a server-stored private key, the two keys forming an asymmetric key pair for server-side authentication.

In certain embodiments, the server may fail to authenticate the beacon in accordance with a unique identifier, such as if the beacon's unique identifier does not comply with the server-stored key. Such instances may occur where an insecure beacon "spoofs" a secure beacon and attempts to deliver a message reserved for the secure beacon. In such instances, the server may reject the content request and terminate at this step, or it may alternatively continue to step 204 wherein the content to which the device browser is directed is designated for unauthenticated beacons.

In an embodiment, the host server may receive and process certain information in the content request in accordance with analytical information unrelated to the destination address and associated content to be designated in step 204. For example, the content request may contain non-content information including the battery state of the beacon, sensory data, and other contextual information which may be useful for marketing analytics or for other purposes.

The method 200 may continue with a fourth step 204 wherein the host server directs the mobile device browser to content designated for the respective beacon in the form of a destination URL. In an embodiment, the server may direct the device browser via a URL redirection, wherein the URL transmitted via the content request is processed by the server and then associated with a destination URL. In other embodiments, the server may determine content in association with a device application as opposed to a browser, wherein the content designated is to be populated in the mobile device application.

In relevant embodiments, the server may determine the destination URL designated for the unique beacon based in part on the additional informational tags included in the content request. The server may further append or include information tags to the determined destination URL based in part on designated inputs from the beacon administrator via the hosted web portal. For example, the server may direct the mobile device browser or application to presentation of the destination URL in accordance with satisfaction of administrator-designated threshold parameters as further may be determined by the mobile device browser or application itself, based on tags including without limitation: user proximity to the beacon, user identity, application type, phone type, time of day, user search query, etc. As a more specific example, one set of content may be designated for authorized users proximate to a beacon, whereas another set of content may be designated for unauthorized users proximate to the same beacon.

The method 200 may continue with a fifth step 205, wherein the host server may direct the device browser to the designated content via a third-party URL (205*a*) or alternatively via a hosted web portal (205*b*). In step 205*a*, the server may redirect to content hosted via a third-party, which will identified by its URL. In certain embodiments, the server may generate a third-party URL including URL tags such as UTM information, the beacon ID, a mobile device supplied user ID, or queries by which the third party website can process information and display content in association with the content designation of the server upon the mobile device. Alternatively, in step 205*b*, the server may provide a destination URL associated with a hosted content server, wherein the device browser may be selectably redirected to hosted content thereby.

The method 200 may continue with a step 206 wherein the host server is configured to determine a location of the mobile device as proximate to one or more of the networked beacons. This step may be distinguished from a determination of distance from a particular beacon, or a direction from the mobile device to said beacon, but rather relates to a determination that the mobile device and by extension an associated user is physically present in proximity with said beacon. Accordingly, the host server is able to provide positive confirmation, for example to the beacon administrator or simply for internal analytics, that the person accessing the destination website is in near proximity to that beacon at that particular time, as opposed to general access as may be obtained from any Internet connected device regardless of location or for example at a later time. In an embodiment, this presence detection function is also based upon the host's ability to positively identify its beacons by their keyed pairing with their cloud server.

Figure 3:
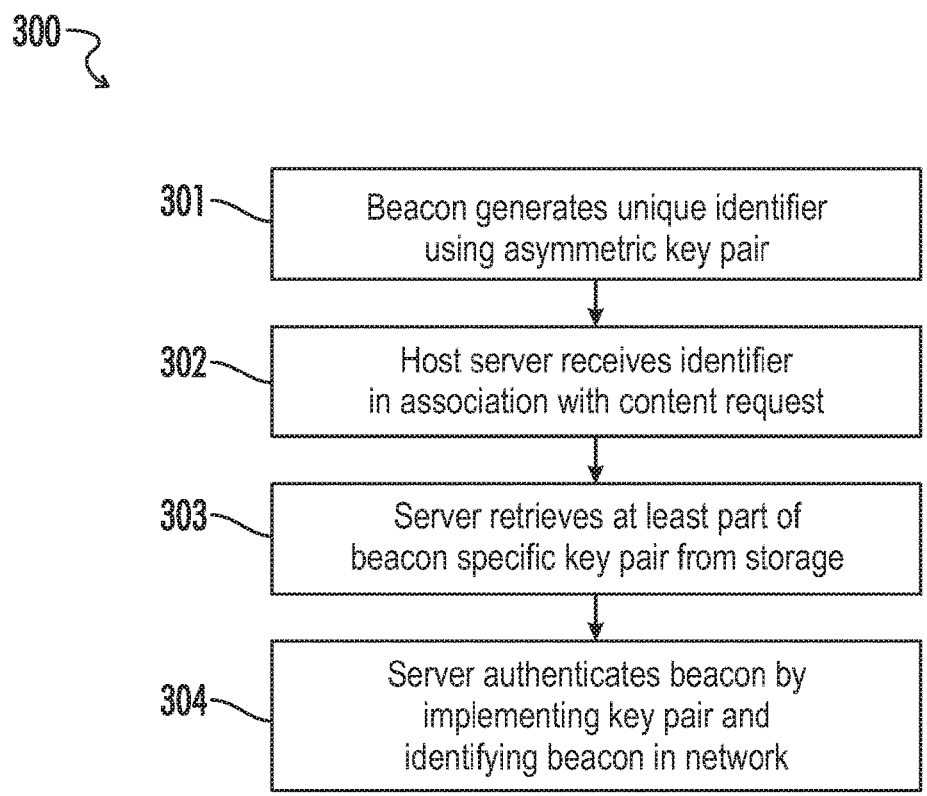
FIG. 3 is a flowchart representing an exemplary process of beacon authentication according to the present disclosure.

Referring now to an exemplary process 300 for beacon authentication as illustrated in FIG. 3, two unique codes may be embedded in the firmware of each of a plurality of hosted beacons at the point of manufacture. Because these codes are issued and are managed by the UMS, they are always guaranteed to be unique and they are also stored in a corresponding file on the hosted cloud UMS server permanently associated with the target beacon.

In an embodiment, the unique codes are public and private keys in an asymmetric key pair as may be implemented for server-side authentication of broadcasts for a respective beacon. The first code may be the beacon's unique ID, which is its public ID. It is this code that is publicly associated with (e.g., affixed to, printed on) the beacon, and it is this same code that one uses to access the associated file in the hosted server where the destination URL is entered (or where web content is directly hosted). The second code is the private passkey that is never exposed, and which is used in conjunction with an encryption algorithm to confirm to the host's cloud server the unique identity of each beacon.

While the private passkey could be the beacon's unique MAC address, such an implementation may typically not be recommended for reason that it complicates manufacturing by necessitating the recovery of the MAC address associated with a beacon ID during the manufacturing process for use in the UMS, if one is to avoid having to pair with the target beacon during deployment.

With respect to the aforementioned process 300, the algorithm references a beacon's private passkey to continually change its identifier (step 301), which pattern can be uniquely recognized by the hosted server (step 302) because it has the beacon's passkey. In an embodiment, the system may generate authenticatable messages with each new identifier/security key, the respective identifier having been generated via encryption techniques using the private passkey. In one embodiment, the host causes its beacon to broadcast the respective security key as a dummy subdirectory of the URL being broadcast, as data following a "#" separator, or the like.

For example, if the beacon ID is "KLtHbr" and its momentary security key is "6H8k9", then the URI that the beacon will broadcast will be www.KLtHbr/6H8k9. Pursuant to a content request associated with said broadcast, the hosted server will use the "6H8k9 sub-directory" to identify the beacon and then will discard this identifying sub-directory (step 303). In alternate embodiments, the system may use a separator such as for example a "#" (or equivalent alternative) between the public beacon identifier and the security key, or no separator at all, where the UMS server knows the field length of the ID and the Key. Finally, the server (step 304) authenticates the beacon by retrieving and validating the asymmetric key pair and identifying the beacon in the network.

In another exemplary aspect of a system according to the present disclosure, a monitoring feature for the beacon power supply (e.g., internal battery) may be added within the framework previously described. Because the beacon is broadcasting a URI that might look like: http://phy.net/HYHKuu#278iM, with the last field being the changing security key based upon the private key embedded into each beacon, we can easily have the beacon also send a reading of its battery's voltage level in the same field, which will allow the host server to interpret and thus monitor battery state. Similarly, beacons may include many different sensors and the sensor data from any of these beacons may be transmitted in the additional transmitted date.

Alternatively, depending upon the number of characters required to implement security, the security key may be transmitted in alternate broadcast from the sensor data to allow both to be transmitted.

In one particular example as provided herein for further illustration, the server has received the above URI: http://phy.net/HYHKuu#278iM. The server interprets the key "278iM" for security and battery state, and then discards the number. Typically, it would then return the destination URL (http://destinationwebsite.com) to the requesting browser so that the browser may then view the requested web page.

In an embodiment, the server as disclosed herein may further provide any amount of additional information to improve the customers' experience. This may be accomplished by providing coded information in addition to the destination URL. An exemplary transmission from the server to the browser may look like or equivalent to the following: http://demo-url.com#8NJHRF, where additional information about the desired user experience is added after a "#" separator (or other character, which separator will serve to introduce the coded information). Although the additional coded information here is represented with six alphanumeric characters, it should be noted that in this context the coded information is not limited to the same, and may be substantially more complex or lengthy as desired. Alternatively, the UMS may transmit a file to the browser, which includes the additional information.

In an embodiment, the first information provided by the server to the browser is the desired viewing range. Using an example of an art gallery to describe the problem being solved, if one were in a gallery room, with six pieces of art on each of four walls, and each piece had Physical Web beacon attached, then a consumer would typically see all twenty-four pieces of art with her web browser, and possibly a few more from adjacent rooms. This makes it harder to identify and select the one piece of art in front of which the viewer is standing. Today one can mitigate this problem by individually turning down the transmit power of the radios in each of the beacons, which is a cumbersome task at least for the reason that again, it required one to be near to and to "pair" with the beacons to be adjusted.

Figure 4:
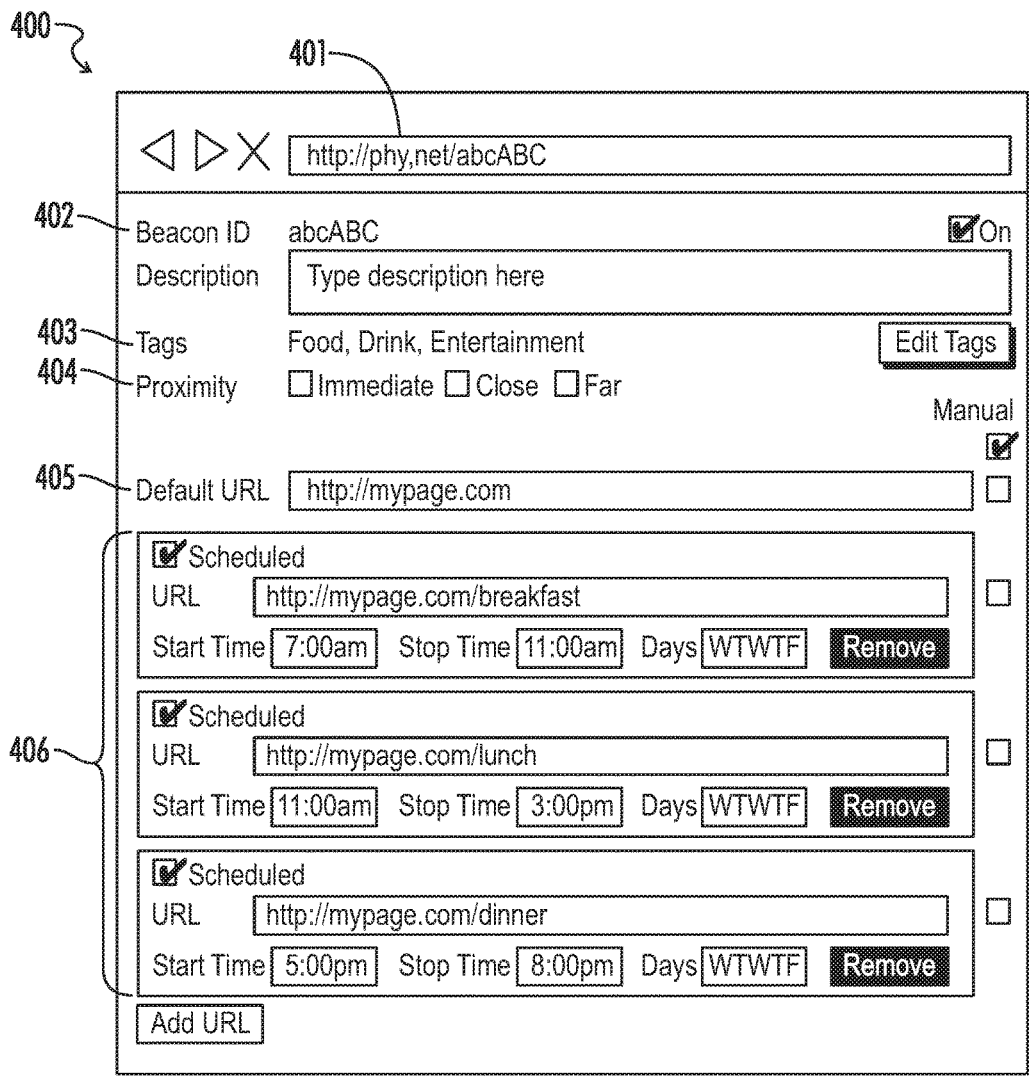
FIG. 4 is a graphical diagram representing an embodiment of a hosted user interface according to the present disclosure.

By utilizing systems and methods as disclosed herein, and with further reference to FIG. 4, one can set the desired viewing range by simply checking a box indicating at a hosted administrative web portal 400. This is the same portal where the destination URL 405 may be set. The user interface might work for example where a beacon having ID# Ah8unT 402 is pointed toward destination URL http://demo-url.com and has a designated viewing distance 404 of "IMMEDIATE", which would cause one to see this URL on a hosted web browser if one is within a certain proximity, such as for example about approximately three feet of the piece of art.

By using this method, the administrator is not adjusting the transmit power of the beacon, but instead is passing back to the viewing browser the range at which it should make the website (in the coded message #8NJHRF) available for user selection, such that the browser, which can measure range because of its ability to monitor the beacon's signal strength, can then make use of this preference to decide whether to display the website, or alternately, how to rank it on the browser display.

In another aspect according to the present disclosure, tagging options 403 may be facilitated in a similar way, where the user will be able to choose on the UMS server portal the TAGs that should be associated with a website.

In one example, the following tags may be listed in the host server administrative portal, and allow the user to check those that apply to the beacon's location, and further pass this information to the browser in the coded message after the "#" or other separator, wherein the browser can use these tags to filter and rank content:

FOOD
DRINK
RETAIL
DEALS
ARTS
ENTERTAINMENT
TRANSPORTATION
SPORTS
HISTORY
POINTS OF INTEREST
VEND
INFORMATION/DIRECTIONS
PEOPLE
REAL ESTATE
HELP WANTED
FOR SALE
COMMERCIAL
UNIQUE

In various embodiments, these tags may also be returned as query codes.

For example, if a beacon is located at a restaurant, and is alternately pointed to either the menu or to a promotional deal, then one might check the "FOOD" tag and the browser would know to show this content first if the consumer was looking for food, while similarly not ranking highly the apartment for rent above the restaurant tagged as "REAL ESTATE".

Various embodiments of systems and methods as disclosed herein therefore enable people who deploy beacons to be able to simply enter basic information about those beacons, including viewing range and location description, and to be able to automatically present this information as an addition to the destination URL, so that the browser can use it to display information in a manner most relevant to a consumer. As noted otherwise herein, one of skill in the art may appreciate that the information conveyed may be about more than the beacon, and may be about or otherwise facilitate personalizing the experience by providing information that influences what content is rendered on the destination web page.

One additional benefit of this approach is that the UMS administrative portal will also allow one to set up and pre-designate alternate destination web pages for a beacon and simply swap between them, or to automatically swap between them according to a predetermined schedule.

For example, again by reference to a portion 406 of the user interface 400 in FIG. 4, a first destination URL (e.g., https:/mypage.com/breakfast) may be designated for content requests from a client device browser occurring between 7:00 am and 11:00 am, while a second destination URL (e.g., https:/mypage.com/lunch) may be designated for content requests from a client device browser occurring between 11:00 am and 3:00 pm, and a third destination URL (e.g., https:/mypage.com/dinner) may be designated for content requests from a client device browser occurring between 5:00 pm and 8:00 pm, etc.

In another aspect, various embodiments of a system and method as disclosed herein may provide additional service enhancements when one makes use of a host web server to enhance, translate and augment the information broadcast by a Physical Web beacon. For example, in one embodiment a user may manage destination website metadata (e.g., pertaining to favicons, titles, descriptions and the like) at the host server level. The host server could return these selections to the browser in place of the metadata embedded in the destination web site, thus allowing the administrator to make easy changes to the information that will appear on the consumer's search display to describe the destination website.

The server may further or otherwise return more than one URL to the browser, thus acting as more than one Physical Web beacon. For example, a parking sign broadcasting a URL with parking information could also return a second URL for "neighborhood notices". Restaurants could have one URL for the menu, and a second for specials. The alternate URL could even be "leased".

As previously noted, one problem with conventional applications is that where multiple beacons broadcast the same URL, the source location of the user who accesses the beacons is lost. Various embodiments of a hosted system as disclosed herein address this problem by routing all beacon traffic through a central hosted server (e.g., PHY.net), which is thereby in a position to add source information back into the transition, thus allowing content providers to know exactly which beacon originated the beacon scan. This feature is further enabled by the presence of a unique identifier for each of the associated beacons.

In one particular example, a beacon in accordance with the present disclosure broadcasts its unique identifier in a format such as follows:
  http://phy.net/ABC123,
where "PHY.net" can be used by the beacon browser in accordance with the hosted server to translate this identifier into a destination URL or the like in accordance with for example a user (content owner) designation.

The hosted server may further coordinate with the beacon browser to generate a "source identifier" including a beacon's unique identifier with the destination URL as either a hash extension, or as a query variable, with the preferred implementation being a query variable. In one example, the respective beacon may broadcast:
  http://phy.net/abc123, wherein the desired destination URL as for example designated by the content owner is:
  http://discountcoupon1x1.com,
and further wherein the hosted server returns a message string including the destination URL and an exemplary query variable as follows:
  http://discountcoupon1x1.com/?physource=abc123

By adding the original unique beacon identifier as a query variable to the end of the destination URL, through a variable ("physource"), the hosted server and by extension authorized users are able to associate the point of origin to the access of the destination URL (i.e., website). As such, the server hosting the website can use this information through its own database to determine the source location of the access, or the query variable ("physource") may be used via a hosted server API to retrieve information about the source location from the hosted server.

For illustrative purposes, consider the example where a merchant user associated with convenience stores implements the hosted server to bulk edit (building on features as previously noted herein) 1,000 beacons in 1,000 different stores all to point to the resource locator "https://beer-ad.com". As this website is accessed through beacons across the country, the merchant will of course know general statistics about the success of their promotion. However, through further implementation of a source identifier feature as disclosed herein, each click-through will arrive with a unique beacon identifier appended to each access that not only gives confirmation that the access originated from a beacon, it will provide the exact origin of each access. With the feature implemented, the destination URL will look like:
  https://beer-ad.com?physource=abc123
for access thorough one beacon, and:
  https://beer-ad.com?physource=xyz456
for access from another. With such information, the retailer will be able to see which store has the most accesses, or which areas of the country.

In accordance with various embodiments as disclosed herein, a system and method may enable or provide for additional extensions or query variables, as may be of value to a retailer or other content source.

As one example, the hosted server may coordinate with beacon browsers to implement a GMT date/time stamp (e.g., using a query variable "phytime") of the initial beacon scan. Accordingly, a retailer may be able to calculate the time delay between a person's initial scan of a URL (i.e., when they were known to be present at the beacon location) and their actual selection and access to the destination URL. Such a time delay will typically indicate saved or shared access to a URL, which is valuable marketing information when combined with the location of the original access.

In an embodiment, the combination of a source identifier (e.g., using query variable "physource") and a time identifier (e.g., using query variable "phytime") may be used to create a unique transaction identifier. This unique transaction identifier may be stored in association with the hosted server and may for example be implemented to stop multiple consumers from getting the same promotion, or forwarding a link to a promotion to consumers that are not present and otherwise eligible for a promotion. If a promotion is of real value, a user may request the website to validate their transaction identifier (e.g., "physource+phytime") via the host API, wherein if the transaction identifier does not exist in the historical record (or if it has already been used), then they are denied. Effectively, through the addition of these query variables, the host system has been able to transfer intelligence to a hosting web server through the URL, including the states of Location and Presence.

In certain embodiments, where for example it may be the case that more than one person is near the same beacon, and scan in the same second, the host server may itself or otherwise in coordination with a beacon browser add a minimal amount of time or merely a number of additional decimal places (e.g., 0.000 ms) to the time (or a duplicate counter) such that a unique transaction identifier is made available for each and every scan transaction.

Multiple appearances of the same transaction identifier, at times increasingly distant from the original access, may be used to track the later reference or sharing of a resource locator such as a web URL, as opposed to its access from someone physically present. When URLs which contain this transaction identifier are accessed, then multiple later accesses from this original access can be tracked, thus potentially telling marketers which promotions are most shared.

As another example, a user selectable campaign identifier (e.g., query variable "phycampaignID") may be appended to for example a source identifier or the like. Content owners may accordingly be able to choose a campaign identifier variable to be appended to destination content messages associated with all beacons designated as being associated with a campaign, so that they can quickly track those accesses that come through the hosted server.

As yet another example, the hosted server may be configured to automatically generate a unique coupon (offer) variable (e.g., "phycouponID") for each access. Accordingly, when the coupon variable is required to be validated against the unique transaction identifier, the content owner or merchant may be assured that the offer can only be used by consumers who were actually present. In an exemplary embodiment, the system in accordance with each instance of the URL being accessed with a unique coupon variable will be able to display that unique coupon code, and retailers will be able to know how many codes were issued and redeemed.

Generally stated, a hosted server and associated beacon browser as disclosed herein leverages centralized administration of beacon transmissions and interactivity to add variables to content URLs that are valuable in their own right, and are more valuable when used in combination, or when used with the host API to retrieve additional user-designated and hosted information.

As previously noted, websites currently have embedded content that is displayed by a browser upon search. In an embodiment, a system as disclosed herein may further enable the implementation or creation of proxy (i.e., "shadow") websites which may be associated with one or more destination websites and reside on the hosted server. These proxy websites may be in a position to control a consumer's interaction with a website, at least up until the time that the destination website is actually selected. When a beacon browser (e.g., Google Chrome) scans a physical web beacon configured in accordance with or otherwise compatible with features and parameters as disclosed herein, it queries the hosted server. Originally, the hosted server would act as a redirect server, and would return the destination URL, whereupon the beacon browser would retrieve information (such as for example the website's title, favicon, and description) from that destination website. Instead of the hosted server returning the destination URL, the shadow website on the hosted server in accordance with the exemplary embodiment disclosed herein may hold the connection and return dynamically set information (e.g., title, favicon, description) which are all easily updated by the customer on the host dashboard. When the shadow website is actually selected, the host will then redirect to the final destination URL (via, e.g., a JavaScript window location set, or via HTML5 http refresh with content set).

There are other foreseeable advantages to this approach beyond enabling dynamic control of the information (e.g., title, favicon, description) associated with a proxy website, independent of the underlying destination website. One such advantage may be that the host will be able to report click-through statistics to the website owner, which otherwise may be unavailable for the reason that browsers do not conventionally make a second call to the host or administrator when a customer selects a scanned destination URL.

Another advantage may be that a website owner will be able to clearly distinguish traffic generated from the hosted server and beacon network, as opposed to from other sources.

Yet another potential advantage may be that a shadow website as disclosed herein can monitor browser activity or otherwise implement devices and objects such as cookies which enable control of the destination content based upon a user's profile.

In accordance with various embodiments as disclosed herein, the web browser may be configured to append information to the URL received from the beacon to be interpreted and acted upon by the UMS server. The appended information may include one or more variables for adding contextual information about the beacon scanning event. For example, appended variables may include a unique customer identifier, an application identifier, user-selected preferences, and the like.

In an embodiment, the beacon browser may add the appended variables to the beacon URL to identify uniquely an associated application such as the beacon browser. For example, if a beacon URL is http://phy.net/abc123, the beacon browser may append a unique application identifier such as phyApp=377647a292333 (sample variable name and content), thereby generating a URL of http://phy.net/ABC123?phyApp=377647a292333.

In an embodiment, the core functionality of the beacon browser can be encapsulated in a Software Development Kit (SDK), which in turn, may be incorporated into a mobile app, thus giving that app the functionality of a beacon browser. Appended variables may be defined in and applied by the SDK, thereby allowing a plurality of applications and beacon browsers to interact with the UMS and the Physical Web in accordance with predetermined criteria.

Various different variables can be appended by the beacon browser or SDK to add contextual information to be sent to the UMS server. For example, in a beacon interaction where a customer is purchasing tour tickets via a beacon interaction, the beacon browser may append "phyTour=child" (sample variable and content) to describe the type of tour the user has selected. Other example variables may identify individual retail stores, identify specific users, indicate user application selections, indicate user-selected preferences on the beacon application, and the like. A plurality of variables may be used, such as "phyTour=child" and "phyUser=VIP2A49." In certain embodiments, the beacon browser may combine a plurality of variables into a single, truncated URL suffix such as "phySDK=Aj501fj3" that can then be interpreted by the UMS server as its constituent variable parts.

By appending browser-based variables, the beacon browser can send contextual information unique to the transaction to the UMS server, enabling greater intelligence in retrieving and returning personalized content. Whereas the URI from the beacon identifies a user's location and proximity, beacon browser variables identify the user and the user's selected preferences. This allows the UMS server to determine not only the user's proximity to a given beacon and query content based upon that interaction, the UMS server can also add all of this information to the destination URL so as to allow the customization that content based on user preferences set in the beacon browser application.

Variables added to the content broadcast by a beacon during the interval when that transaction is handled by a browser, as opposed to variables added at the level of the beacon or at the level of the UMS, are particularly valuable for their ability to identify the user of the app and the user's preferences, whereupon this information may be used by the UMS to determine the content returned to the customer, or these variables may be appended to the destination URL for further processing by a different content management system.

A user may specify preferred brands or specials at the browser/SDK level, whereupon beacon-associated content can then be prioritized and returned in accordance with those preferences. For example, a user may specify that they are interested in promotions related to diabetes in an app making use of the SDK described herein, and that SDK can append the diabetes preference to the URL, thus enabling content so identified to be prioritized to that user. Alternately, information known about a customer may be automatically appended by the browser such as the user's device type. For example, for users of Android devices, content associated with or specified for Android devices may be returned instead of content associated with or specified for Apple devices (e.g. Google Play Store links as opposed to Apple App Store links). In further example, a user who has specified a preference for food specials over drink specials may receive information pertaining to food specials and no longer receive content about drink specials.

After reading the beacon URL and appending application-specified variables, the beacon browser broadcasts the combined URL to the UMS server. The UMS server then interprets the beacon-based suffix string separately from the browser-based suffix string. The UMS processes the browser-based suffix string to determine relevant information therefrom. Relevant information may include instruction information associated with content retrieval, where the suffix string modifies the content that would otherwise be retrieved via the beacon URL. For example, the suffix string may request a different type of page be returned, whereby the UMS server will return a different URL than that it would have returned in accordance with the URL beacon standing alone. In certain embodiments, relevant information may include non-content-based contextual information such as transactional information or analytics, e.g. time, application state, phone state, transaction history, etc. This non-content-based contextual information may be valuable for content providers as consumer analytics.

The UMS server directs the beacon browser to or otherwise makes available for user selection a content server associated with the beacon URL and in accordance with any instructions provided via the browser-based suffix string. In certain embodiments, the UMS server may retrieve the destination URL associated with the beacon URI component of the received URL and then append query variables onto the destination URL, and these appended query variables may be the variables added by the browser, thus transferring them to the destination content server. These embodiments are advantageous in part because when the destination URL is shared by the user with other individuals, the unique query variables are retained, allowing the UMS server to track how, when, by whom, and in some cases to whom the information was shared. Such granular information is particularly valuable to marketers in terms of tracking content popularity and visibility.

In some embodiments, information retrieval may be performed by the beacon browser in association with a combination of beacon URL information and user preferences.

For example, the beacon browser may cache information in advance based upon predefined or heuristic instructions, such as where a user frequents certain beacons or when proximity to one beacon instructs the application to cache certain information. This form of caching may be particularly useful where Internet access is spotty, weak, or non-existent. For example, for a user who purchases a tour that goes through an area with poor data signal, the beacon browser may cache certain content associated with one or more beacons on the tour and in accordance with the specifications selected at the preliminary beacon. In said example, the user may have purchased a child's tour ticket, whereupon the beacon browser may cache tour information in advance and to be retrieved at certain beacons placed throughout the tour where internet access is known to be good. By caching this information, the beacon browser may return content based upon subsequent beacon proximities without having to send and retrieve information to and from the UMS.

Other actions that would be determined by the UMS server may be performed by the beacon browser. For example, the UMS may enable a beacon owner to change the distance at which the beacon becomes visible to consumers.

In an embodiment, a proprietary beacon browser may enable a user to access certain secure or private content associated with the proprietary beacon browser and not others. In this manner, users browsing via specific applications may be able to receive unique content not accessible to other beacon browsers of a different type. For example, users of a branded retail application may be able to receive content such as coupon codes or promotional specials not accessible to users of a generic beacon browser. Because the URLs of beacons are universally available, the same beacon message broadcast could return different content to an open browser than to a proprietary browser.

Proprietary browsers further allow for various types of Physical Web applications beyond dynamic web content access. In certain embodiments, the beacon browser may append a security key in addition to other variables. The appended key may be the same security key associated with the beacon or may be an independent key. For example, the security key may be appended in association with a particular user who has used login credentials with the beacon browser. Inclusion and detection of this key may enable the UMS server to return secured content. For example, a proprietary browser and key may enable an authorized user to access VIP content not available to users accessing the same beacons without a security key. This content may be further secured by making the key single-use, such that copies of the information sent by the secure browser will not also return the private content a second time. In another example, a security guard may be able to check into locations automatically by walking near specific beacons with the proprietary browser enabled.

One problem with beacons of any type is that they are difficult to deploy and manage in scale. When there are hundreds or thousands of identically looking devices together in large groups, it is difficult to organize them. When they have individual, permanent ID's, it becomes easier to identify individual beacons, and to keep them organized. It also becomes possible to deploy them randomly and then have the individual installers set up their location and organizational information, thus distributing the organizational task across multiple installers. But there is still complexity to his task because the individual installers have to have log-in privileges to the installation app or management platform, and they have to have basic instruction on what data needs to be defined and recorded for each installed beacon. If, for example, 2,000 beacons were deployed to 2,000 different store locations in a retail chain, one would effectively need 2,000 different installers to have the capability of logging into an installation app, or to a platform dashboard to define the actual installed location and store number of each beacon in order to later enable unique metrics to be collected for that beacon or for its content to be properly managed.

It would therefore be desirable to have a methodology for beacons to effectively "self-install", whereby the expense of dispatching trained installers can be avoided, and where the task of managing log in credentials of thousands of temporary installers can be avoided.

Embodiments of a system disclosed herein may enable a simplified deployment methodology for beacons where a beacons broadcast are directed to self-install web pages, accessible by browsers. In such embodiments, the beacon is effectively announcing itself on an openly accessible web page and requesting that its location information be defined on that web page by someone nearby. Upon entry, this location information can be stored by the UMS, for later use for metrics or content management, and then the beacon can revert to broadcasting the content for its intended end users or the public at large. For example, if a beacon's ID is "ABC123", and the marketing entity deploying it wants to manage beacons and their marketing content by "store type" and "store number", then beacon "ABC123" can initially broadcast an installation web page titled "Beacon Number ABC123" followed by two requests for information, such as "please enter the store type (e.g. Target or CVS) _____" and "please enter the store number _____." With this approach, any store employee can place the beacon in a desired section of the store, and can access the beacon's self-install page with a browser, whereupon the critical information needed to manage the beacon is simply captured. This embodiment takes advantage of each beacon's unique ID, of the capability of an associated UMS to control the content broadcast by a beacon, and of the ability of that content to be accessed by a universal browser.

Another embodiment of this invention may allow the UMS to add a simple security code to the self-install page, for example a 3-digit PIN, such that the store personnel installing the beacons will have to enter this PIN in order to be able to enter the desired installation information. This simple security PIN can be applied across all of the many beacons in a deployment to make sure that informed employees are entering the installation information.

Still another embodiment of the invention will make these self-install web pages dynamic, such that the information to be collected is defined in the UMS by the beacon owner, thus simplifying the installation process by only collecting only the exact information needed for each installation or promotion. For example, if all that is relevant to a deployment is the store number, then the self-install web page will only request this one piece of information.

Another embodiment of this invention will allow the beacons owner to reinitiate the self-install feature at any time, either for groups or for single beacons. For example, if 1000 beacons are installed for a certain 90-day promotion, then these beacons may be collected at the end of that promotion, and may then be redeployed, whereupon a new instruction to self-install will cause the previous location information to be deleted and new self-install web pages will be generated for broadcast by the beacons to collect the location information needed for the new promotion.

In still other embodiments of this invention the USM will be able to schedule a group of group of beacons to enter self-install mode, will be able to automatically lower the viewing range of beacon when in install mode to keep installation pages from being seen by distant persons, and to stop the collection of metrics during install mode to keep these accesses form skewing any collected marketing metrics.

Figure 5:
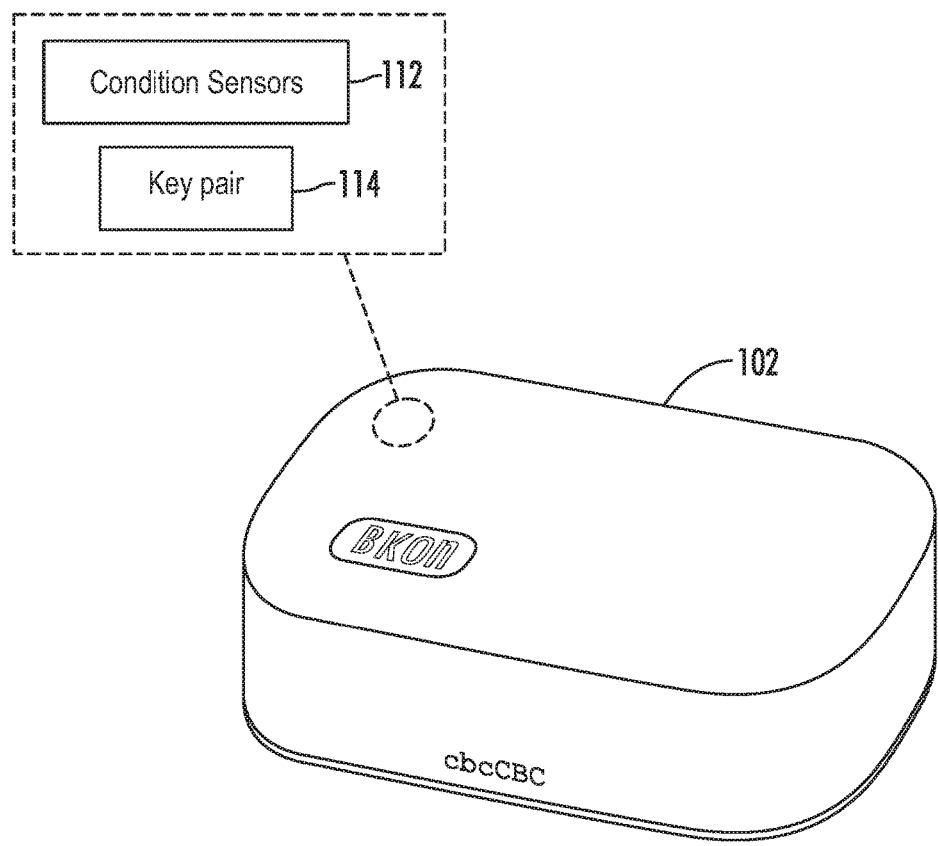
FIG. 5 is a perspective diagram representing an embodiment of a hosted beacon according to the present disclosure.

With reference to FIG. 5, an exemplary beacon 102 may be configured with one or more condition sensors 112 such as for example battery power as further described herein, and may further store information corresponding to an asymmetric key pair 114 or the like for beacon authentication, also as further described herein.

Figure 6:
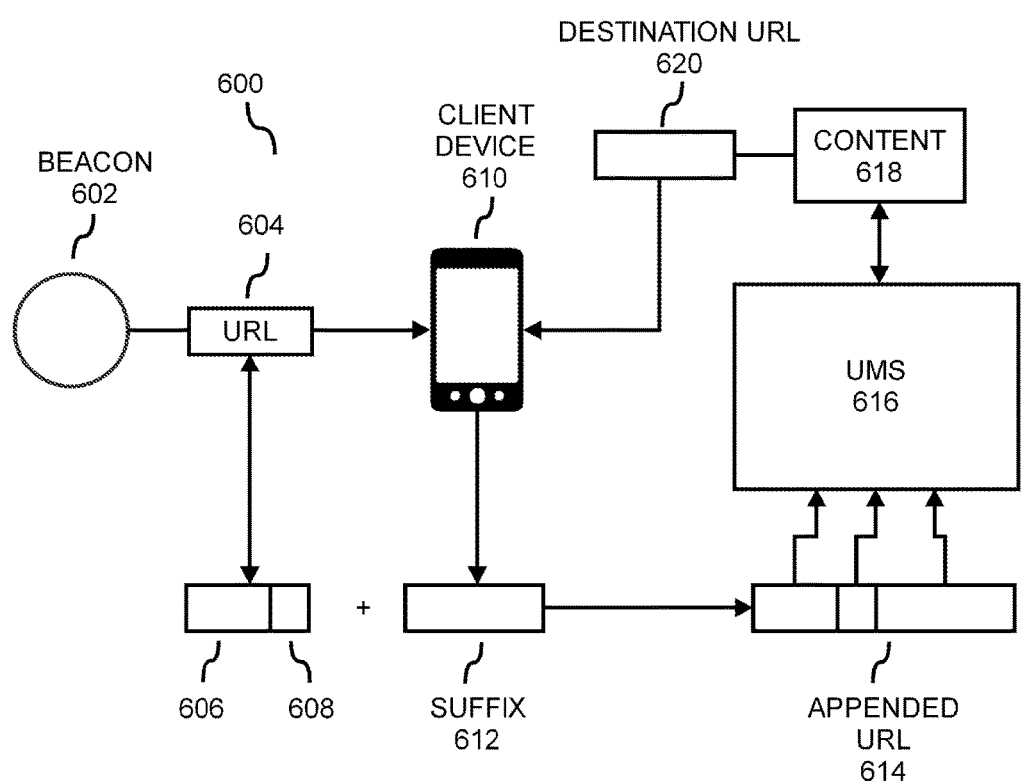
FIG. 6 is a flow diagram representing an embodiment of an application-based hosted beacon web server system according to the present disclosure.

Referring to FIG. 6, an exemplary embodiment of a system 600 as disclosed herein may include a beacon 602 configured to broadcast a URL 604. The URL 604 may be comprised of at least a domain address component 606 and a unique beacon ID 608, wherein the beacon ID 608 is a unique identifier for the associated beacon 602. The URL 604 may comprise an access protocol and hosted server (e.g. http://YYY.net) as the domain address component 606 and a PhyID (e.g. "ABC123") as the beacon ID 608, such that in combination the two form a complete URL (e.g. http://YYY.net/ABC123).

The beacon 602 is configured to broadcast the URL 604 to one or more proximate client devices 610 configured to receive the broadcast. In certain embodiments, the client device 610 may be a mobile device such as a mobile phone, netbook, or laptop. In certain embodiments, the beacon 602 may be geographically fixed, whereas in other embodiments the beacon 602 may be geographically mobile. The broadcast may be in the form of various wireless radio transmission protocols such as Bluetooth, RFID, and similar broadcast forms and frequencies including even for example data encoded audio or light signals, which the client device can interpret in accordance with its radio sensors.

Upon receiving the broadcast, the client device 610 may in some embodiments be configured to append a suffix 612 to the URL 604, thereby generating an appended URL 614. The client device 610 may execute instructions from a browser or application, said browser or application configured to append a suffix to one or more URLs 604 broadcast by beacons 606. In some embodiments, the suffix 612 may comprise one or more information tags. The information tags may embody additional contextual information to be added to the URL 604. Additional contextual information may include, for example, software settings or sensory data such as: user ID, application ID, user query, user settings, software setting state, phone state, date and time, temperature, acceleration, direction, light levels, and the like. Each information tag may pertain to a single setting or multiple settings. For example, the browser or application may be configured to generate a string unique to a plurality of settings and append that string as the suffix 612 to create an appended URL 614 (e.g., "http://YYY.net/ABC123/fj893H5jzXR"). In alternative embodiments, the browser or application may append information tags for each variable (e.g., options"). In further alternative embodiments, the appended URL 614 may be the same as the URL 604 when the suffix 612 is empty or otherwise not added.

Upon appending the suffix 612 the client device 610 queries the appended URL 614, wherein the appended URL 614 directs to a UMS server 616. The UMS server 616 interprets the submitted URL request and processes the constituent components of the appended URL 614. The UMS server 616 may determine the domain address component 606, the unique beacon ID 608, and the one or more information tags of the suffix 612 and interpret those components in reference with a content server 618. In some embodiments, the content server 616 and UMS server 616 may be the same. In some embodiments, the UMS server 616 may process the information tags which pertain to logistical or metric information and remove those tags from the submitted URL request.

In response to a content request from a device, the UMS server 616 generates a destination URL 620, with the appended contextual variables, for the determined content on the content server 618 and delivers that destination URL to the client device 610. The client device 610 may submit a plurality of content requests to the hosted server 616 where for example broadcasts from numerous beacons have been received by the device with respect to a single location. In this case, the hosted server 616 may return one or more destination URLs 620 to the device 610 in accordance with the plurality of content requests. The destination URLs 620 may be presented via the device as a selectable list of content options, in the common form of an internet search display, wherein upon selection of any one particular content options, content may be accessed from the respective content server for that destination URL. Accordingly, the browser or application on the client device 610 receives contextually specific content via the destination URL 620 in reference to the proximate beacon 602.

In some embodiments, the UMS server 616 may include additional information tags on the destination URL 620 whereby the application or browser on the client device 610 is configured to read, interpret, and act upon the added information tags. For example, the destination URL 620 may contain information tags which provide instructions for rendering the content, which authenticate content in accordance with a security key, which instruct the application to perform certain actions, and the like.

Figure 7:
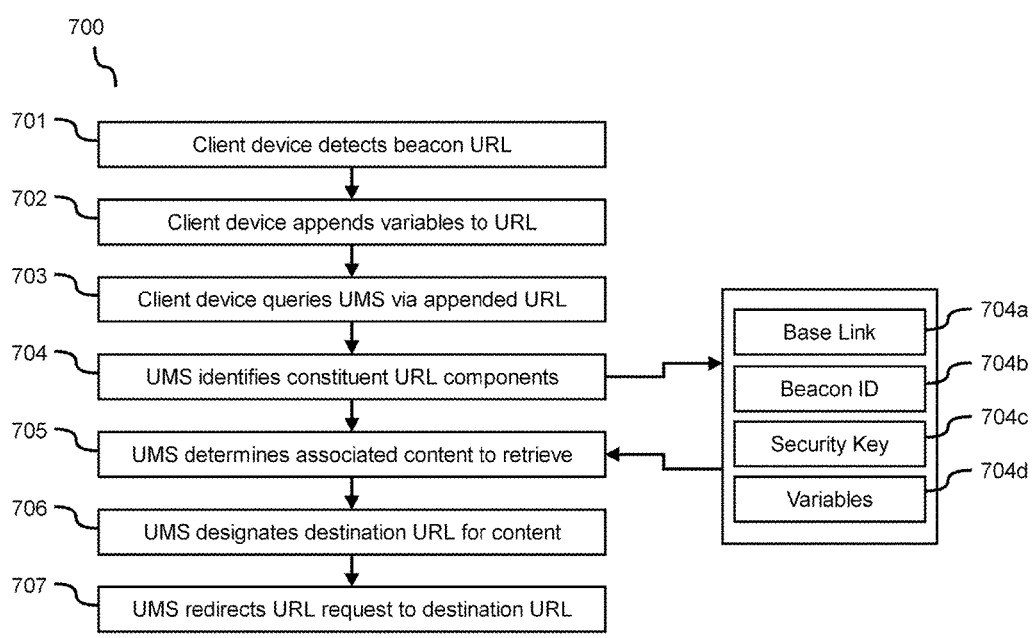
FIG. 7 is a flowchart representing an exemplary process of content retrieval according to the present disclosure.

Referring now to FIG. 7, an exemplary method 700 as disclosed herein for retrieving content as referenced above and particularly in regard to FIG. 6 may be described as follows. The method 700 may be characterized in part wherein a client device is configured to perform a first step 701 wherein the client device detects a URL broadcast by a beacon. The client device may detect the URL broadcast via one or more various sensors such as proximity-based wireless protocols such as RFID, WiFi, Bluetooth, and the like, the client device sufficiently proximate to the beacon to detect the broadcast.

The method 700 may further be characterized in part by the step 702, wherein the client device, via an associated browser or application, appends zero, one, or more variables to the received URL in accordance with software instructions therein, thereby generating an appended URL. In some embodiments, the appended variables may embody contextual information about the client device or client state, or device user wherein the beacon URL transmits information pertinent to the beacon (e.g. PhyID, battery state, location) in the URL and the client device appends device-based information such as user settings, user input, device state, software state, and proximity to the beacon. In an embodiment, the client device may append a series of variables, wherein each variable corresponds to an individual quantum of information; in an alternative embodiment, the client device may append a variable string, wherein the string represents a plurality of quanta of information.

The method 700 may further be characterized in part by step 703, wherein the client device queries a UMS server via the appended URL. The client device may be connected to the UMS server via a communications network. In some embodiments, the UMS server may be hosted at the location specified in the broadcast URL, whereby the appended variables provide the UMS server information to be processed.

The method 700 may further be characterized in part by step 704, wherein the UMS server identifies the constituent components of the URL and obtains contextual information therefrom. For example, the UMS server may identify the base URL link which directs the client device to the UMS server location on the communications network (704a). The UMS server may further identify the beacon ID (704b) and determine from a database the unique beacon, beacon location, and controlling account to which that beacon is assigned. In some embodiments, the beacon URL may contain information pertaining to the battery state of the beacon, whereby the UMS server identifies the battery level remaining in the beacon. The UMS server may further identify a public security key (704c) and a continuously changing key which is based on a private security key stored upon the UMS server as an asymmetrical key pair verification method. In some embodiments, the public security key may be a component of or may be itself the beacon ID; in alternative embodiments, the public security key may be an appended variable. The UMS server may further identify from the beacon ID the one or more appended variables (704d).

The method 700 may further be characterized in part by step 705, wherein a hosted content server or third party content server may use the components identified in step 704 to return more relevant content to the client device. In one embodiment, the UMS server may internally process certain components (e.g., battery state) while appending or embedding other components with respect to a destination URL, wherein the appended variables may provide delimitations for the content server as to a subset of the associated content. For example, where an appended variable states the browser type being used on the client device, the UMS server may pass the appended variable on the content server to facilitate downstream content selection and delivery. In embodiments wherein the UMS server is the content server, the UMS may use the appended variable to help determine an arrangement of content compatible for display via the stated browser. In some embodiments, the UMS server may process certain components and/or variables irrespective of the content to be retrieved, wherein such components and/or variables provide non-content-based information such as marketing metrics. For example, the UMS server may separately process a timestamp of the original access, a phone activity state, a user ID, or other such information which will not affect the selection, curation, or display of content to be retrieved.

The method 700 may further be characterized in part by step 706, wherein the UMS server designates a destination URL for the content to be retrieved in accordance with the determinations made in step 705. The destination URL may in some embodiments be a unique URL for the display of the specific set or subset of content determined. In some embodiments, the destination URL may direct to a third-party content management server. In certain embodiments, the UMS server may further append variables to the destination URL as contextual information to be processed by the third-party content management server. The appended variables may in some embodiments provide non-content information for purposes of marketing and metric information.

The method 700 may further be characterized in part by step 707, wherein the UMS server redirects the client device's original URL request to the destination URL, thereby providing the client device the content determined in step 705. In some embodiments, the UMS server may further append variables to the destination URL as contextual information or instructional information to be processed by the client device's browser or application. In various embodiments, the variables appended to the original URL by the beacon or the browser can be transferred to the destination URL by the UMS, thus effectively transferring them to the content server where they have the greatest usefulness.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

As defined herein, the term "beacon" may at least refer to devices with short range communications, configured to transmit wireless signals detectable by mobile devices proximately located thereto. Examples of such beacons may typically include, but unless otherwise stated are not expressly limited to, radio frequency (RF) beacons (e.g., those configured to transmit Bluetooth™ Low Energy (BLE) signals), and may further be configured for fixed application (e.g., a battery powered beacon mounted to a known location), or for mobile application (e.g., a USB beacon mountable to a mobile device). The term "beacon" may indeed be attributed broader scope than normal with respect to one of ordinary skill in the art, but is intended herein unless otherwise expressly stated to incorporate alternative devices implementing equivalent location based technologies such as for example near field communication (NFC) protocol.

As used herein, the term "beacon browser" may at least refer to web browsers operable with respect to a user computing device, and which are configured when enabled or otherwise operating on the computing device to continuously or user-selectably scan for and detect wireless signals transmitted by beacons proximately located thereto, in a manner understood by those of skill in the art. Such beacon browsers may typically be configured to display information corresponding to destinations, content and/or objects associated with the scanned beacons, and further to enable user selection, execution and/or linking to such destinations, content and/or objects. In some embodiments, the beacon browser may refer to a non-browser computer program such as a mobile phone application configured to display information on a display.

The term "user interface" as used herein may unless otherwise stated include any input-output module with respect to the hosted server including but not limited to web portals, such as individual web pages or those collectively defining a hosted website, mobile applications, desktop applications, telephony interfaces such as interactive voice response (IVR), and the like. Such interfaces may in a broader sense include pop-ups or links to third party websites for the purpose of further accessing and/or integrating associated materials, data or program functions via the hosted system and in accordance with methods of the present invention.

The term "communications network" as used herein with respect to data communication between two or more parties or otherwise between communications network interfaces associated with two or more parties may refer to any one of, or a combination of any two or more of, telecommunications networks (whether wired, wireless, cellular or the like), a global network such as the Internet, local networks, network links, Internet Service Providers (ISP's), and intermediate communication interfaces.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A system comprising:
   a plurality of location-based source devices selected from a group comprising one or more of beacon transmitters, Quick Response (QR) codes and Near Field Communication (NFC) devices, each associated with a source Uniform Resource Locator (URL) comprising a domain associated with a hosted server and a unique identifier;
   a user interface associated with the hosted server and accessible via a communications network to enable designation by an authorized user of one or more destination URLs for one or more of the respective source devices, and displayable metadata in association with the one or more destination URLs for the respective source devices;
   a client device having a hosted mobile application residing thereon, and configured
      upon reading the source URL from one or more source devices to generate a first request to the hosted server,
      wherein the hosted server is configured to coordinate with the client device to generate one or more selectable tokens corresponding respectively to the one or more source devices and comprising displayed metadata, and
      further upon user selection of one of the one or more tokens, to generate a second request including contextual information to the hosted server; and
   wherein the hosted server is configured, upon receiving the second request from the client device, to generate a return message directing the client device to at least one of the one or more destination URLs designated for the respective source device and based at least in part on the contextual information included in the second message.

2. The system of claim 1, wherein the hosted server further comprises one or more proxy websites associated with a respective destination URL, and
   the client device is configured, based upon reading the source URL from the one or more source devices, to generate the one or more selectable tokens comprising the designated metadata corresponding to the one or more proxy websites that are associated with the designated destination URL.

3. The system of claim 2, wherein each selectable token is associated with a different destination URL.

4. The system of claim 1, wherein the hosted server is further configured to process one or more contextual information tags appended to the host domain in the request from the client device, and to include one or more of the contextual information tags to the destination URL in the return message to the client device.

5. The system of claim 4, wherein the contextual information tags appended by the mobile application comprise variables associated with unique user identification and user-selected preferences set in the mobile application, and
   wherein the hosted server is configured to generate the return message including one or more destination URLs based at least in part on one or more of the identified user and the user-selected preferences.

6. A system comprising:
   a plurality of location-based source devices selected from a group comprising one or more of beacon transmitters, Quick Response (QR) codes and Near Field Communication (NFC) devices, each associated with a source Uniform Resource Locator (URL) comprising a domain associated with a hosted server and a unique identifier;
   a user interface associated with the hosted server and accessible via a communications network to enable designation by an authorized user of one or more destination URLs for one or more of the respective source devices, and of displayable metadata in association with the one or more destination URLs for the respective content source devices;
   wherein the hosted server is configured, responsive to a first message indicating client device proximity to one or more of the source devices, to direct the client device to one or more hosted proxy websites associated with said one or more of the source devices, the one or more proxy websites displaying the respectively designated metadata and comprising a corresponding selectable token; and
   wherein the hosted server is configured, responsive to a second message including contextual information and indicating user selection of the token corresponding to one of the proxy websites, to direct the client device to at least one of the associated one or more destination URLs based at least in part on the contextual information included in the second message.

7. The system of claim 6, wherein each selectable token is associated with a different destination URL.

8. The system of claim 6, wherein the message indicating user selection of the token further comprises appended contextual information tags, and the hosted server is further configured to process the one or more contextual information tags and to append one or more of the contextual information tags to the destination URL in a return message.

9. The system of claim 8, wherein the hosted server is further configured to generate a return message comprising the designated destination URL based at least in part on one or more of the contextual information tags.

10. The system of claim 9, wherein the contextual information tags comprise variables associated with unique identification and preferences associated with the user selecting the selectable token, and
    wherein the hosted server is configured to generate the return message including one or more destination URLs based at least in part on one or more of the identified user and the user-selected preferences.

11. The system of claim 9, wherein the contextual information tags comprise a security key associated with a particular user having login credentials, and
    wherein the hosted server is configured to generate the return message including a destination URL with secured content, based on the identified user and the security key.

* * * * *